US012244356B2

United States Patent
Wei

(10) Patent No.: US 12,244,356 B2
(45) Date of Patent: Mar. 4, 2025

(54) METHODS AND SYSTEMS FOR NULLING IN WIRELESS COMMUNICATION NETWORKS

(71) Applicant: ZTE Corporation, Guangdong (CN)

(72) Inventor: Ning Wei, Guangdong (CN)

(73) Assignee: ZTE Corporation, Shenzhen (CN)

( * ) Notice: Subject to any disclaimer, the term of this patent is extended or adjusted under 35 U.S.C. 154(b) by 374 days.

(21) Appl. No.: 17/866,139

(22) Filed: Jul. 15, 2022

(65) Prior Publication Data

US 2022/0352994 A1    Nov. 3, 2022

Related U.S. Application Data

(63) Continuation of application No. PCT/CN2020/073021, filed on Jan. 19, 2020.

(51) Int. Cl.
*H04B 15/00* (2006.01)
*H04L 5/00* (2006.01)

(52) U.S. Cl.
CPC ........... *H04B 15/00* (2013.01); *H04L 5/0053* (2013.01)

(58) Field of Classification Search
CPC ....... H04B 15/00; H04B 15/02; H04L 5/0053; H04L 5/0055
See application file for complete search history.

(56) References Cited

U.S. PATENT DOCUMENTS

| | | | |
|---|---|---|---|
| 10,264,544 B1* | 4/2019 | Chu | ........ H04L 5/0048 |
| 2013/0195081 A1 | 8/2013 | Merlin et al. | |
| 2014/0241240 A1 | 8/2014 | Kloper et al. | |
| 2015/0016438 A1 | 1/2015 | Harel et al. | |
| 2015/0055587 A1 | 2/2015 | Sampath et al. | |
| 2016/0119933 A1* | 4/2016 | Merlin | ........ H04L 27/2613 370/312 |
| 2018/0249471 A1 | 8/2018 | Wang et al. | |
| 2018/0262936 A1 | 9/2018 | Zhou et al. | |
| 2018/0263045 A1 | 9/2018 | Zhou et al. | |

(Continued)

FOREIGN PATENT DOCUMENTS

| | | | |
|---|---|---|---|
| CN | 102438250 A | 5/2012 | |
| CN | 104735789 A | 6/2015 | |
| CN | 105474722 A | 4/2016 | |

(Continued)

OTHER PUBLICATIONS

European Search Report for EP Patent Application No. 20887369.5, dated Nov. 18, 2022, 8 pages.

(Continued)

*Primary Examiner* — Keith Ferguson
(74) *Attorney, Agent, or Firm* — Perkins Coie LLP

(57) ABSTRACT

Methods and systems for nulling in wireless communication networks are disclosed herein. In one embodiment, a method performed by a first wireless communication node for initiating a nulling transmission includes: transmitting a control message to be received by a second wireless communication node, wherein the control message informs the second wireless communication node to initiate the nulling transmission toward a first station; and transmitting data to the first station during transmission of the nulling transmission from the second wireless communication node to the first station.

20 Claims, 7 Drawing Sheets

(56) References Cited

U.S. PATENT DOCUMENTS

2019/0036583 A1    1/2019    Cherian et al.

FOREIGN PATENT DOCUMENTS

| | | | |
|---|---|---|---|
| CN | 106604285 | A | 4/2017 |
| CN | 107087442 | A | 8/2017 |
| CN | 107181557 | A | 9/2017 |
| EP | 3140925 | B1 | 3/2018 |
| EP | 3216305 | B1 | 1/2022 |
| WO | 2014003256 | A1 | 1/2014 |
| WO | 2014101205 | A1 | 7/2014 |
| WO | 2019051338 | A1 | 3/2019 |

OTHER PUBLICATIONS

Fahmy et al., "A Selective CSMA Protocol with Cooperative Nulling for Ad Hoc Networks with Smart Antennas," Wireless Communications and Networking Conference, 2004, IEEE, vol. 1, pp. 387-392, XP010708554, Atlanta, Georgia, Mar. 21-25, 2004, 6 pages.

Japanese office action issued in JP Patent Application No. 2022-543686, dated Aug. 30, 2023, 6 pages. English translation included.

International Preliminary Report on Patentability issued in International Patent Application No. PCT/CN2020/073021, dated Jul. 19, 2022, 5 pages.

International Search Report and Written Opinion for International Application No. PCT/CN2020/073021, mailed on Apr. 15, 2020 (7 pages).

Chinese office action issued in CN Patent Application No. 202080082865.0, dated Jun. 7, 2024, 23 pages. English translation included.

Huawei et al., "Discussion on remote interference mitigation mechanisms," 3GPP TSG RAN WG1 Meeting #95, R1-1812216, Spokane, USA, Nov. 12-16, 2018, 7 pages.

* cited by examiner

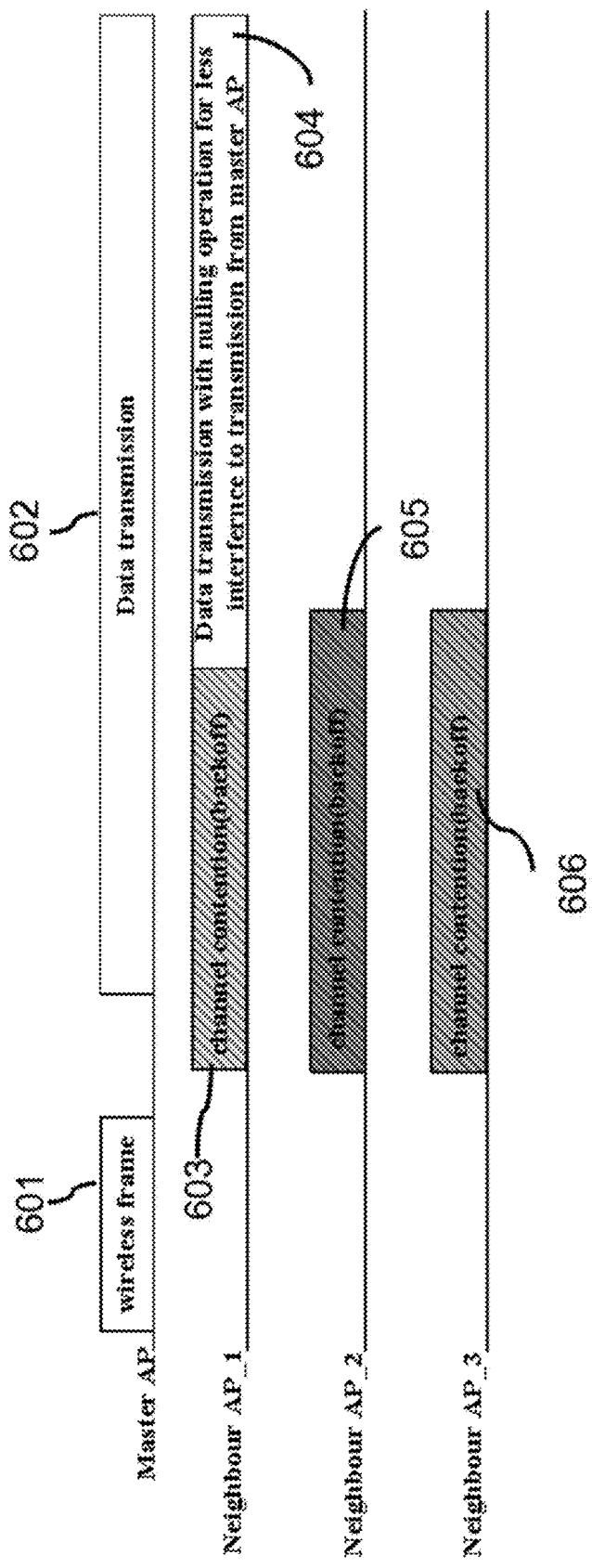

METHODS AND SYSTEMS FOR NULLING IN WIRELESS COMMUNICATION NETWORKS

CROSS-REFERENCE TO RELATED APPLICATIONS

This application is a continuation of International Patent Application No. PCT/CN2020/073021, filed on Jan. 19, 2020, the contents of which are incorporated herein by reference in their entirety.

TECHNICAL FIELD

The disclosure relates generally to wireless communications and, more particularly, to methods and systems for inter-cell interference nulling in wireless communication networks.

BACKGROUND

With the rapid growth of user data, the demand for spectrum is increasing. Previous solutions addressing existing and emerging user data traffic demands increased data rates by widening frequency channels or densifying base station (BS) deployments. For example, channel bandwidth increased from 200 kHz in 2G Global System for Mobile Communications (GSM) to 5 MHz in 3G Wideband Code Division Multiple Access (WCDMA) and 20 MHz in 4G Long Term Evolution (LTE) to 100 MHz in LTE-Advanced Pro. However, the conventional sub-6 GHz frequency spectrum is almost fully allocated and expensive for system operators to license. Moreover, further network densification is limited by the cost and time needed to acquire backhaul connections and siting permits in millions of local jurisdictions. Furthermore, full reuse of the frequency resources across even neighboring cells leads to a high levels of inter-cell interference, which in turn severely limits available communication speeds for certain users, especially at cell-edge.

With regards to wireless local area networks, same challenges exist as in cellular wireless networks. For example, dense deployment of Access Points (APs) in many stores, apartment complexes, or shopping malls resulted in an overlap of Basic Service Sets (BSS), thereby reducing the performance of each network. Existing solutions tackle the problem of overlapping BSS or inter-cell interference in wireless local area networks by using different orthogonal channels on each AP. However, this solution is impractical when the number of APs exceeds the number of available orthogonal channels.

Reuse of frequency resources across neighboring cells can increase the capacity of wireless network designs. However, inter-cell interference management systems and methods are needed. In particular, systems and methods for inter-cell interference nulling between neighboring cells are needed.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a first wireless communication node for initiating a nulling transmission includes: transmitting a control message to be received by a second wireless communication node, wherein the control message informs the second wireless communication node to initiate the nulling transmission toward a first station; and transmitting data to the first station during transmission of the nulling transmission from the second wireless communication node to the first station.

In another embodiment, a method performed by a first wireless communication node for providing a nulling transmission includes: receiving a control message from a second wireless communication node, wherein the control message informs the first wireless communication node to initiate the nulling transmission toward a first station; and transmitting data to a second station during transmission of the nulling transmission from the first wireless communication node to the first station.

In further embodiments, an apparatus for initiating a nulling transmission includes: a transceiver configured to: transmit a control message to be received by a wireless communication node, wherein the control message informs the wireless communication node to initiate the nulling transmission toward a first station; and transmit data to the first station during transmission of the nulling transmission from the wireless communication node to the first station.

In yet further embodiments, an apparatus for initiating a nulling transmission includes: a receiver configured to receive a control message from a wireless communication node; at least one processor configured to control an antenna to direct the nulling transmission toward a first station based on the received control message; and a transmitter configured to transmit data to a second station while transmitting the nulling transmission to the first station.

In further embodiments, the invention provides a non-transitory computer-readable storage medium storing computer-executable instructions that when executed perform any one of the methods disclosed herein.

In yet further embodiments, a wireless communication node includes a memory storing computer-executable instructions that when executed perform any one of the methods disclosed herein; and at least one processor, coupled to the memory, and configured to execute the computer-executable instructions.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

FIG. 6 illustrate a timing diagram for transmitting a first control message, a first channel contention window, a second channel contention window with suspended back-off procedure, a third channel contention window with suspended back-off procedure, a data transmission to a first station, and a data transmission with interference nulling to a second station, in accordance with further embodiments of the invention.

DETAILED DESCRIPTION OF EXEMPLARY EMBODIMENTS

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

As discussed herein, a "wireless communication node" can include, or be implemented as, a next Generation Node B (gNB), an E-UTRAN Node B (eNB), a Transmission Reception Point (TRP), an Access Point (AP), a donor node (DN), a relay node, a core network (CN) node, a RAN node, a master node, a secondary node, a distributed unit (DU), a centralized unit (CU), etc., in accordance with the customary understanding of these terms in the art. Furthermore, as discussed herein, a "wireless communication device" can include, or be implemented as, a station (STA), a mobile terminal (MT), mobile station (MS), etc., in accordance with the customary understanding of these terms in the art. In the description of exemplary embodiments below, the "wireless communication node" is referred to as an "AP" and the "wireless communication device" is referred to as a "STA." It should be understood, however, that the scope of the present disclosure is not limited to these exemplary embodiments.

Figure 1:
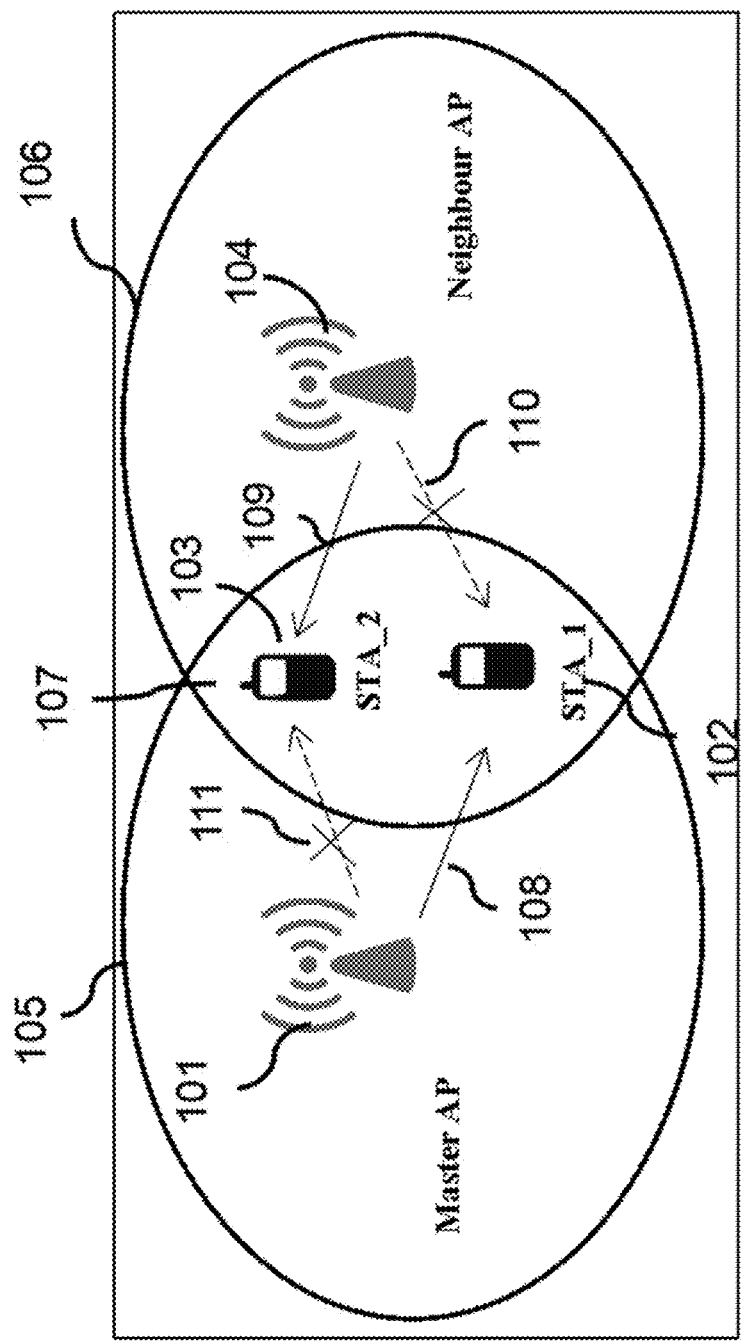
FIG. 1 illustrates a block diagram of an exemplary multi-cell communication network in which interference nulling techniques disclosed herein may be implemented, in accordance with some embodiments of the invention.

FIG. 1 illustrates an exemplary communication network 100 in which inter-cell interference nulling techniques disclosed herein may be implemented, in accordance with some embodiments of the invention. As shown in FIG. 1, the exemplary multi-cell communication network 100 includes a master AP (MAP) 101, a neighbor AP (NAP) 104 and a plurality of STAs, e.g., a first STA 102 and a second STA 103, communicatively coupled to the MAP 101 and NAP 104 via respective RF links 108, 109, 110, and 111. In some embodiments, the RF links 108, 109, 110, and 111 are unlicensed links. In various embodiments, RF links 108, 109, 110, and 111 operate in the millimeter wave radio frequency band, such as the 60 GHz unlicensed band. FIG. 1 also illustrates a wireless cell coverage 105 of the MAP 101 and a wireless cell coverage 106 of the NAP 104. In some embodiments, the wireless cells 105 and 106 may have an overlapping coverage area 107, as shown in FIG. 1. In further embodiments, STAs 102 and 103 may be co-located in the overlapping coverage area 107, near the cell-edges of the wireless cells 105 and 106. Thus, the present disclosure describes systems and methods for providing inter-cell interference nulling for stations located in overlapping coverage area 107, in accordance with some embodiments.

In accordance with various embodiments, the MAP 101 and the NAP 104 may each be equipped with multiple antennas (e.g., an antenna array) configured to provide a multiple-input multiple output (MIMO) link with the plurality of STAs 102 and 103. In alternative embodiments, the MAP 101 and the NAP 104 may each be equipped with a phased array antenna capable of forming one or more beams of radio waves that can be electronically steered. Additionally, the MAP 101 and the NAP 104 are configured to carry out transmissions to the plurality of STAs 102 and 103 using the same channel resources, such as frequency and time. Although only two APs 101 and 104, and only two STAs 102 and 103, are shown in FIG. 1, it is understood that additional APs and additional STAs can be present in the wireless network to implement the inter-cell interference nulling techniques described herein, in accordance with various embodiments of the invention.

Similarly to the MAP 101 and the NAP 104, the STAs 102 and 103 may each also include multiple antennas or a phased antenna array. In alternative embodiments, STAs 102 and 103 may each be equipped with a single antenna. In the example shown in FIG. 1, STAs 102 and 103 may be associated with the MAP 101 and the NAP 104. In one embodiment, STAs, 102 and 103 may be associated with the MAP 101 and the NAP 104 via the Basic Service Set (BSS).

As shown in FIG. 1, the MAP 101 is configured to generate and transmit a data transmission beam 108 to the first STA 102, and the NAP 104 is configured to generate and transmit a data transmission beam 109 to the second STA 103. The MAP 101 is further configured to generate and transmit an interference nulling beam 111 intended to null/minimize the transmitted power toward the second STA 103, and the NAP 104 is further configured to generate and transmit an interference nulling beam 110 intended to null/minimize the transmitted power toward the first STA 102. In accordance with various embodiments, the MAP 101 and the NAP 104 may utilize any precoding schemes to form the interference nulling beams 109 and 110. For example, the MAP 101 and the NAP 104 may utilize a linear precoding technique, such as the zero-forcing (ZF) beamforming method to null interference signals toward STAs 102 and 103. Such precoding enables the MAP 101 and the NAP 104 to create antenna patterns that favor wave propagation along desired spatial directions while attenuating (nulling) propagation along undesired directions.

In some embodiments, the MAP 101 and the NAP 104 rely on estimated channel-state information (CSI), which describes channel properties of the RF links between a transmitter and a receiver, to form data transmission beams 108 and 109, respectively, and the interference nulling beams 110 and 111, respectively. As shown in FIG. 1, the MAP 101 can simultaneously transmit the data transmission beam 108 to the first STA 102 and the interference nulling beam 111 to the second STA 103, in accordance with some embodiments. Similarly, the NAP 104 can simultaneously transmit the data transmission beam 109 to the second STA 103 and the interference nulling beam 110 to the first STA 102, in accordance with some embodiments. Furthermore, channel-state information (CSI) may represent the propagation state of a communication link from a transmitter to a receiver such as the aggregate effect of scattering, fading, and power decay with distance, for example.

In general, a receiver can estimate the CSI by a predefined signal (such as reference signal, training signal or pilot signal) in the received wireless frame. Thus, CSI makes it possible to adapt transmissions in accordance with channel conditions so that a higher network throughput and spectrum efficiency can be achieved in MIMO systems. In some embodiment, CSI may be utilized to compute a precoding vector/matrix for beamforming in order to minimize signal energy at a target receiver. CSI can also be used to determine if the interference to another target receiver in a neighbor network can be cancelled, in accordance with some embodiments. In some embodiments, CSI can be represented in the form of channel impulse response in the time domain or a channel frequency response in the frequency domain.

Figure 2A:
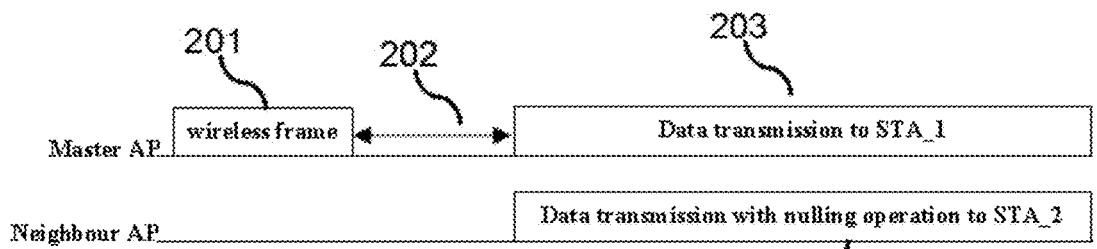
FIG. 2A illustrate a timing diagram for transmitting a control message, a data transmission to a first station, and a data transmission with interference nulling to a second station, in accordance with some embodiments of the invention.

FIG. 2A illustrates a timing diagram for transmitting a wireless control message 201 from a master AP (e.g., MAP 101) to a neighbor AP (e.g., NAP 104), wherein the control message informs the neighbor AP that a nulling transmission 204 from the neighbor AP to a target station (e.g., first STA 102) is allowed. In some embodiments, the control message 201 is transmitted in a wireless frame. In alternative embodiments, the control message 201 may be transmitted in any suitable data format (e.g., subframe, resource block (RB), etc.) having any suitable length/size for a given wireless network, system or protocol. As shown in FIG. 2A, in some embodiments, the master AP starts a data transmission 203 to the target station after a predetermined amount of time 202 upon completion of transmission of the control message 201. In some embodiments, the wireless frame that carries the wireless control message 201 may be an announcement or a trigger frame. In some embodiments, the wireless frame that carries the wireless control message 201 may be a null packet comprising only a preamble portion of a data packet. In some embodiments, the predetermined amount of time 202 may be one SIFS (e.g., 16 microseconds).

In some embodiments, the wireless control message 201 may include an identification of one or more neighbor APs (e.g., NAP 104). For example, the wireless control message 201 may include a single ID, a group ID, a media access control (MAC) address, a pair ID for one or more neighbor APs, two or more single IDs, multiple group IDs, multiple MAC addresses, or pair IDs for two or more neighbor APs that is/are permitted to transmit a nulling transmission 204 to one or more target STAs. Upon receiving the control message, the one or more neighbor APs are configured to transmit a data transmission to a respective STA (e.g., second STA 103), different from the target STA (e.g., first STA 102), with a nulling operation toward the target STA. In other words, each neighbor AP will transmit data to a respective intended STA while simultaneously transmitting a nulling transmission (i.e., an interference nulling beam) to a respective target STA. The effect of the nulling transmission is to cancel the effects of any interference from the intended data transmission to the intended STA that may reach the target STA. In some embodiments, the one or more neighbor APs will start transmitting the data transmission with nulling operation 204 after a predetermined time period after receiving the control message 201, such that the data transmission with nulling operation 204 will commence at substantially the same time the Master AP starts its data transmission 203 to the target STA.

Figure 2B:
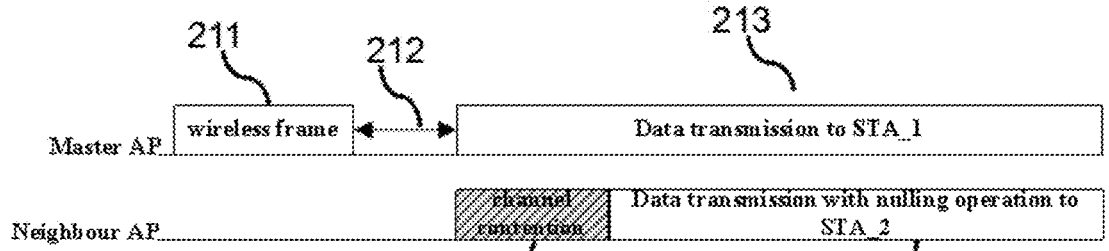
FIG. 2B illustrate a timing diagram for transmitting a control message, a channel contention window, a data transmission to a first station, and a data transmission with interference nulling to a second station, in accordance with further embodiments of the invention.

Referring to FIG. 2B, in some embodiments, a master AP will transmit a control message (e.g., a wireless frame) 211, and after a predetermined period of time 212, transmit a data transmission 213 to a target STA (e.g., first STA 102). This is similar to the embodiment described above with respect to FIG. 2A. However, in this embodiment, after a neighbor AP receives a control message 211 from a master AP, the neighbor AP may initiate a channel contention protocol 214. The channel contention protocol 214 may be any mechanism used to share a given wireless channel among a plurality of APs desiring to utilize the wireless channel at the same time. For example, the channel contention protocol 214 may be based on the Enhanced Distributed Channel Access (EDCA) or the Distributed Channel Function (DCF) mechanisms. In accordance with various other embodiments, when using Enhanced Distributed Channel Access (EDCA) or the Distributed Channel Function (DCF) mechanisms, the neighbor AP may be allowed to have a higher priority to access a shared wireless channel than the stations associated with it.

Figure 2C:
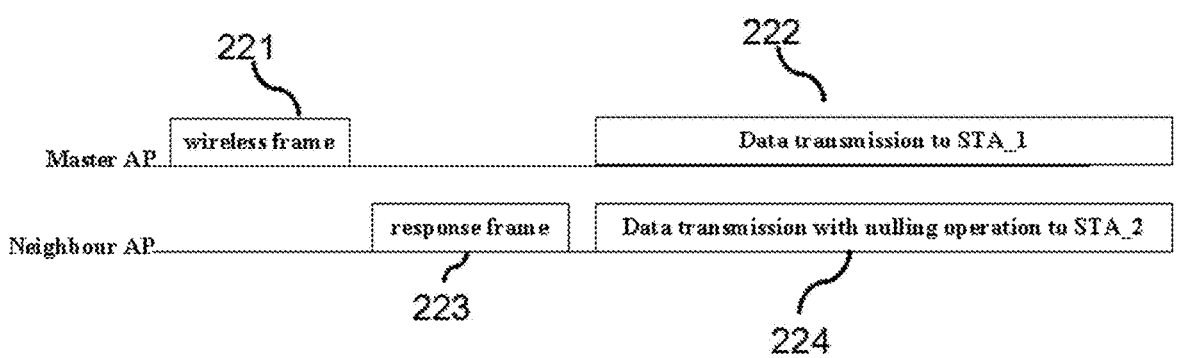
FIG. 2C illustrate a timing diagram for transmitting a control message, a response message, a data transmission to a first station, and a data transmission with interference nulling to a second station, in accordance with various embodiments of the invention.

FIG. 2C illustrate a timing diagram for transmitting a control message, a response message, a data transmission to a first station, and a data transmission with interference nulling to a second station, in accordance with further embodiments of the invention. FIG. 2C is similar FIG. 2A, however, in response to receiving a control message 221, a neighbor AP will transmit a response message 223. In accordance with various embodiments, the response message 223 may be an Acknowledgment (ACK) frame, a Clear To Send (CTS) control frame, or a Null frame. In some embodiments, the master AP may start a data transmission 222 following a predetermined period of time after receiving the response message 223 from the neighbor AP. Similarly, the neighbor AP will initiate transmitting a data transmission with nulling operation 224 following a predetermined period of time after completion of transmission of the response message 223. In some embodiments, both the master AP and neighbor AP will begin their respective transmissions 222 and 224 at substantially the same time following completion of transmission of the response message 223.

Additionally, the response message 223 may be transmitted by the neighbor AP to occupy a wireless channel in advance of transmitting a data transmission with nulling operation 224. In this case, a channel contention procedure with other neighbor APs may not be necessary since upon detecting the response message transmitted by a first neighbor AP, other neighbor APs can be preconfigured to stay their respective channel contention procedures for a predetermined period of time. In some embodiments, the response message 223 may include information related to the duration time a shared wireless channel may be occupied by the neighbor AP while performing the data transmission with nulling operation 224. Thus, other neighbor APs may stay their respective channel contention procedures for the indicated duration time for performing the data transmission with nulling operation 224. As discussed above, the data transmission with nulling operation 224 comprises a data transmission to an intended STA (e.g., second STA 103) while simultaneously transmitting an interference canceling "nulling transmission" to a target STA (e.g., first STA 102).

In further embodiments, information about the duration or the length of a data transmission from a master AP or a neighbor AP can be included in the wireless control message 221 and/or in the response message 223. In the event of uneven durations of data transmissions from the master AP and the neighbor AP, the maximum duration of data transmissions may be used in setting a length field of data transmission frames. In some embodiments, the maximum duration may be set in an L-SIG field or the Duration field of a MAC header, for example. Thus, all involved APs may add additional transmission time "padding" to align their data transmission frames with the maximum duration of data transmission frames that will be allocated to an AP.

Figure 3A:
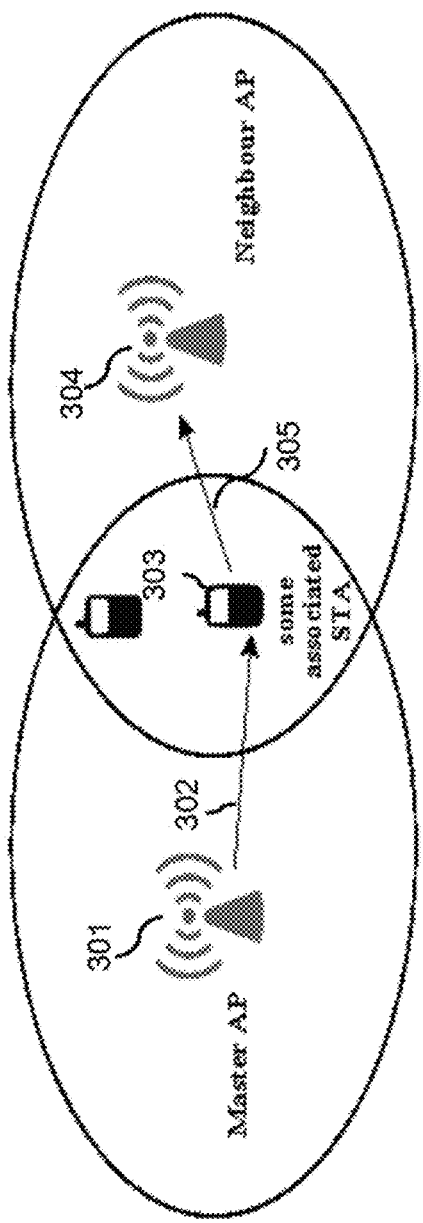
FIG. 3A illustrates a block diagram of an exemplary multi-cell communication network in which a station transmits or relays a control message to a wireless communication node, in accordance with some embodiments of the invention.

FIG. 3A illustrates a block diagram of an exemplary multi-cell communication network in which a station transmits or relays a control message to a wireless communication node, in accordance with some embodiments of the invention. As shown in FIG. 3A, a master AP (MAP) 301 sends a wireless control message via an RF link 302 to some associated station (STA) 303. Upon receiving the wireless control message from the MAP 301, the STA 303 may relay the original control message or transmit an updated wireless control message, via an RF link 305, to a neighbor AP (NAP) 304 which informs the NAP 304 it can perform a nulling transmission. In some embodiments, the STA 303 may directly forward or relay a first wireless frame containing a control message received from the MAP 301 unchanged to the NAP 304. In alternative embodiments, the MAP 301 transmits a first wireless frame containing a first control message to the STA 303. The first control message instructs the STA 303 to transmit a second wireless frame containing a second control message to the NAP 304. The second control message instructs the NAP 304 that nulling transmissions are allowed for the NAP 304. Upon receiving either the first or second control messages, the NAP 304 can perform data transmissions with a nulling operation in accordance with any of the methods discussed above with respect to FIGS. 2A-2C, for example.

Figure 3B:
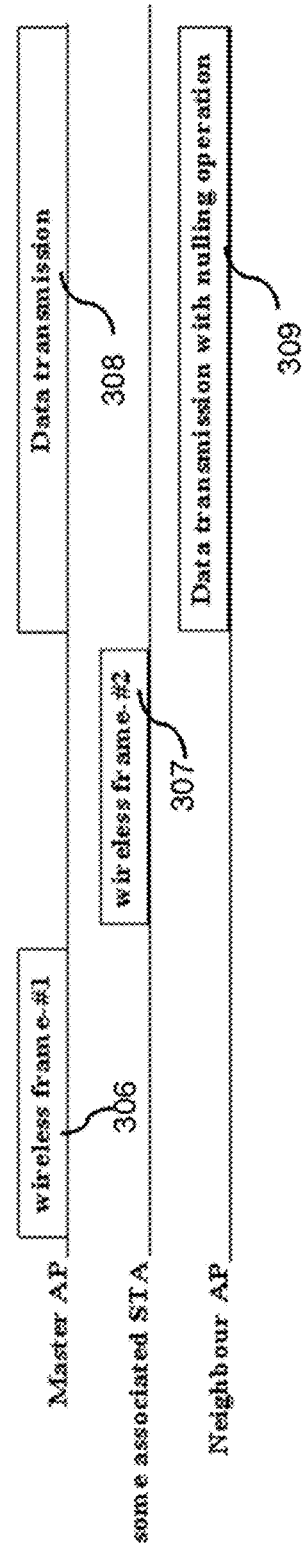
FIG. 3B illustrate a timing diagram for transmitting a first control message, a second control message, a data transmission to a first station, and a data transmission with interference nulling to a second station, in accordance with further embodiments of the invention.

FIG. 3B illustrates a timing diagram of a method of transmitting a wireless control message 306 from a master AP (MAP) to an associated station (STA), which in turn transmits an updated wireless control message 307 that informs a neighbor AP (NAP) that a nulling transmission is allowed. As shown in FIG. 3B, the MAP transmits a wireless control message 306 within a first wireless frame to the STA. In some embodiments, the STA may transmit an updated wireless control message 307 in a second wireless frame following a Short Intermessage Spacing (SIFS) interval (e.g., 16 us) after receiving a wireless control message 306. In further embodiments, an updated wireless control message 307 may be an Acknowledgment (ACK) message. In some embodiments, the STA may transmit an updated wireless control message 307 after performing a channel contention protocol, as discussed above. Additionally, both the MAP and NAP may initiate a data transmission 308 and a nulling transmission 309, respectively, following a predetermined time after completion of transmission of the updated wireless control message 307 from the associated station. In alternative embodiments, the associated STA can simply relay the first wireless frame containing the first control message to the NAP, as discussed above. Upon receiving either the first or second control messages, the NAP 304 can perform data transmissions with a nulling operation in accordance with any of the methods discussed above with respect to FIGS. 2A-2C, for example.

Figure 4:
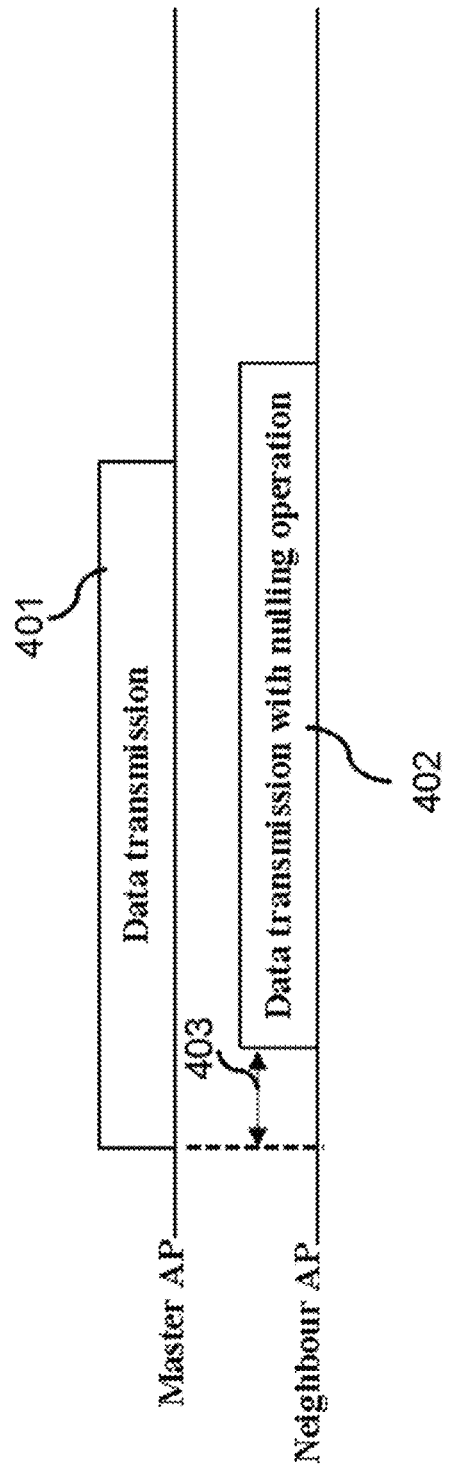
FIG. 4 illustrate a timing diagram for a data transmission to a first station, and a delayed data transmission with interference nulling to a second station, in accordance with various embodiments of the invention.

FIG. 4 illustrates a timing diagram of a method of transmitting a data transmission message 401 from a master AP with a control message, indicating a nulling transmission is allowed, embedded in the data transmission message 401, in accordance with various embodiments of the invention. In some embodiments, the data transmission message 401 may include an identification of one or more neighbor APs permitted to transmit a data transmission with nulling operation 402. For example, the data transmission message 401 may include a single AP ID, a group ID of neighbor APs, a MAC address, or a pair ID of neighbor APs that is/are permitted to transmit a nulling transmission 402 with their respective data transmissions to respective stations. In other embodiments, information indicating a nulling transmission, an identification of a neighbor AP, and any other additional control message/signaling may be included in a preamble or in a PHY header of the data transmission message 401. In some embodiments, a neighbor AP may start a data transmission with nulling operation 402 after a predetermined time period 403 after receiving a data transmission message 401, as indicated in FIG. 4. In further embodiments, after receiving the control message, the neighbor AP may perform operations in accordance with any of the methods discussed above with respect to FIGS. 2A-2C.

Figure 5A:
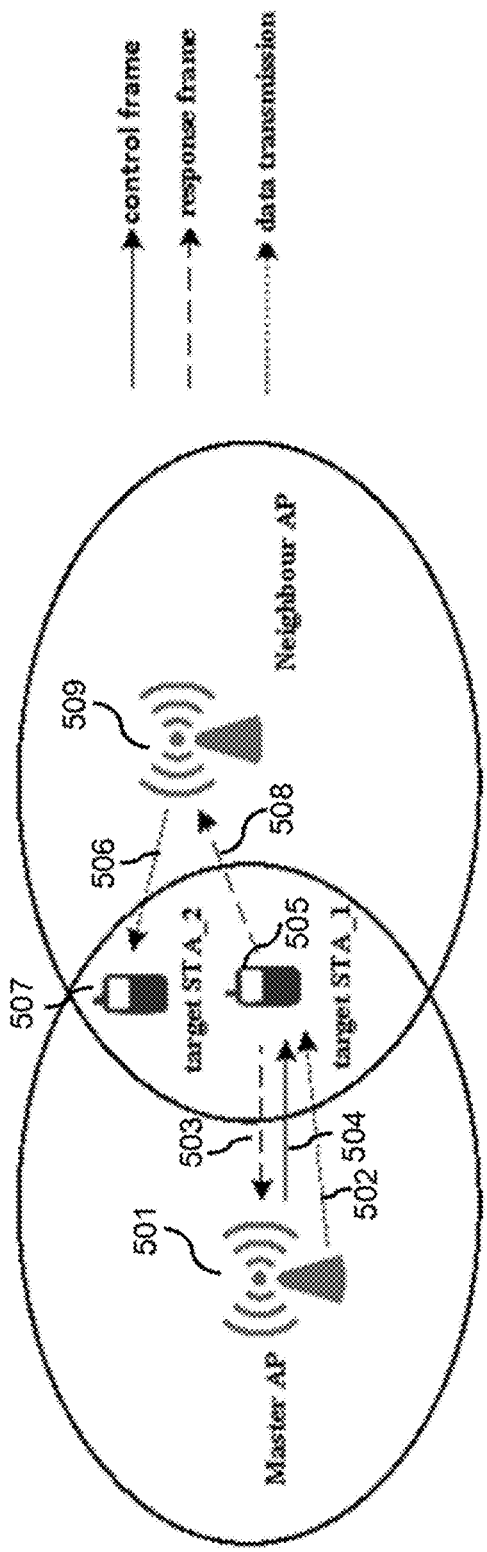
FIG. 5A illustrates a block diagram of an exemplary multi-cell communication network in which interference nulling techniques are implemented with a first station receiving a control message from a first communication node and transmitting a response message before receiving a data transmission, in accordance with some embodiments of the invention.

FIG. 5A illustrates a block diagram of an exemplary multi-cell communication network in which interference nulling techniques are implemented with a first station receiving a control message from a first communication node and transmitting a response message before receiving a data transmission, in accordance with some embodiments of the invention. As shown in FIG. 5A, a master AP (MAP) 501 sends a wireless control message via an RF link 504 to a first station (STA) 505. Upon receiving the wireless control message from the MAP 501, a STA 505 may transmit a response message, via RF links 503 and 508, to the MAP 501 and a neighbor AP (NAP) 509, respectively. The response message indicates to the NAP 509 that it is permitted to perform a nulling transmission. In some embodiments, the NAP 509 may estimate the channel-state information (CSI) from the received response message from STA 505. Additionally, the NAP 509 may store the channel-state information (CSI) measurements. Furthermore, the NAP 509 may utilize stored CSI in forming the interference nulling beam towards the STA 505.

Upon receiving the response message from STA 505, the MAP 501 and the NAP 509 may start a data transmission via RF links 502 and 506, respectively. In accordance with various embodiments, the NAP 509 selects a second target station (STA) 507 associated with the NAP 509 to transmit data to the target station 507 based on one or more predefined criteria. In some embodiments, the one more predefined criteria can be a residual signal strength towards the first STA 505 is less than or equal to a predetermined threshold value when the NAP 509 transmits data to the second STA 507 with a nulling transmission toward the first STA 505. Alternatively, if no target station within the wireless cell coverage of the NAP 509 satisfies the residual signal strength condition, a data transmission with nulling operation from the NAP 509 is paused.

Figure 5B:
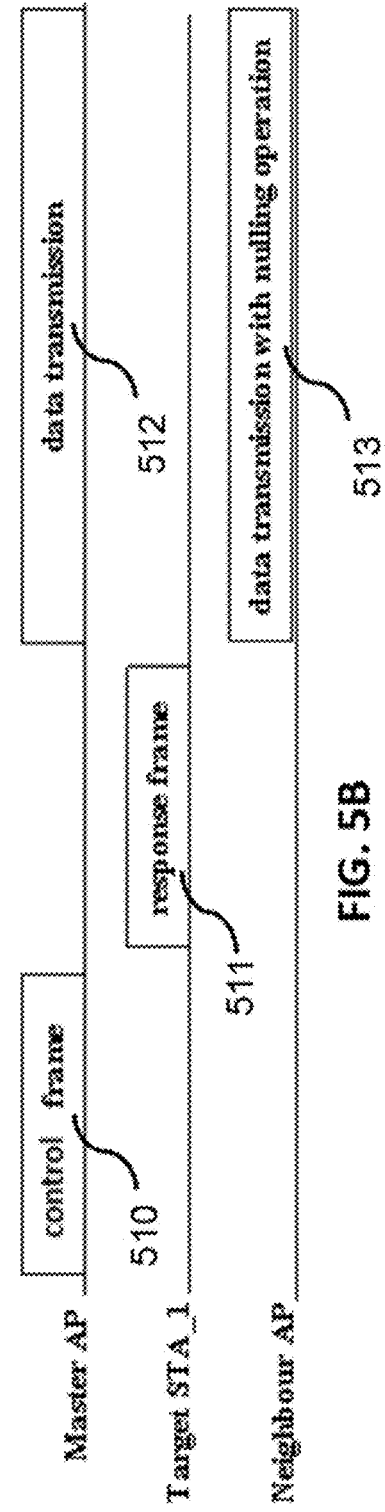
FIG. 5B illustrate a timing diagram for transmitting a first control message, a second response message, a data transmission to a first station, and a data transmission with nulling to a second station, in accordance with further embodiments of the invention.

FIG. 5B illustrates a timing diagram for transmitting a wireless control message 510 from a master AP (MAP) to a target station, which in turn transmits a response message 511 informing both the MAP and a neighbor AP (NAP) that a nulling transmission is allowed, in accordance with some embodiments. In some embodiments, the wireless control message 510 may be embedded in a wireless frame. In some embodiments, the response message 511 may be contained in a wireless frame, referred to as a "response frame 511." In some embodiments the response frame 511 may be a NULL frame. In other embodiments, the response frame 511 may be embedded in the PHY header of a wireless frame transmitted from the target station. Furthermore, the response message contained in the response frame 511 may be included in a SIG field or training signal of a wireless frame. As shown in FIG. 5B, the MAP and the NAP may start a data transmission 512 and a data transmission with nulling operation 513, respectively, after a predetermined time interval after receiving the response message 511. In further embodiments, after receiving the response message 511, the NAP may perform operations in accordance with any of the methods discussed above with respect to FIGS. 2A-2C.

In some embodiments, there may be several neighboring APs causing inter-cell interference. FIG. 6 illustrates a timing diagram of a method for limiting nulling transmissions in the presence of several interfering neighboring APs, in accordance with various embodiments of the invention. For example, a MAP may transmit a wireless control message 601 comprising information indicating a nulling transmission is allowed or desired, IDs of one or more NAPs, along with other additional control messages/signaling in a preamble or in the PHY header of a wireless frame in accordance with a given protocol. Moreover, the MAP may transmit a data transmission message 602 after a predetermined amount of time. Additionally, a Carrier Sense Multiple Access with Collision Avoidance (CSMA/CA) mechanism may be implemented among NAPs that detected or received a nulling transmission 604 from another neighbor AP. For example, one of the NAPs may end its channel contention back-off window 603 earlier than other NAPs and may start a data transmission with nulling operation 604. Upon detecting the data transmission with nulling operation 604 from the first NAP, other NAPs may suspend their current decrementing back-off counters for channel contention, thereby delaying their respective channel contention backoff procedures 605 and 606, respectively, for a predetermined time. After the predetermined time has expired, the respective channel contention backoff procedures 605 and 606 are once again initiated.

Figure 7:
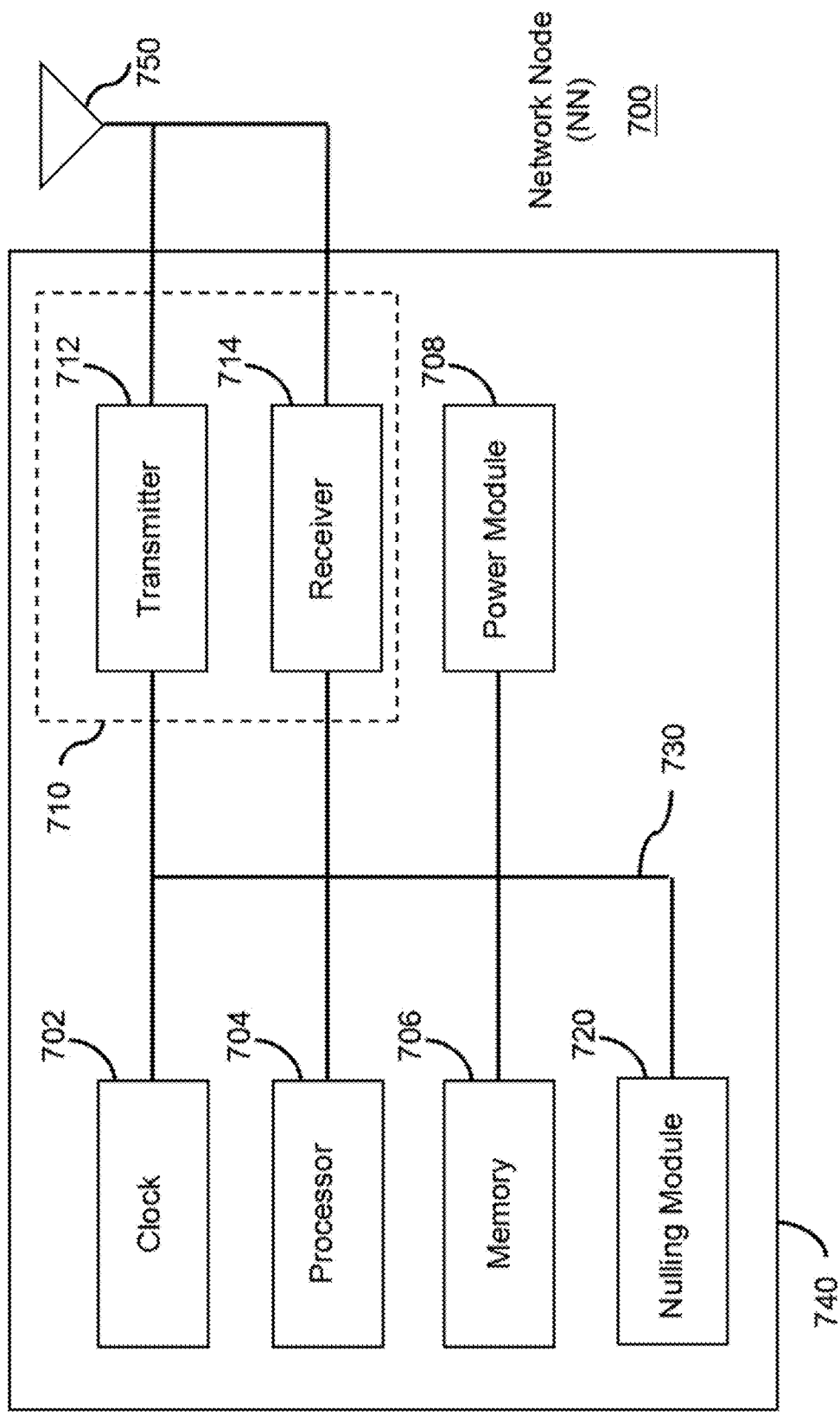
FIG. 7 illustrates a block diagram of a wireless communication node configured to perform the methods disclosed herein, in accordance with various embodiments of the invention.

FIG. 7 illustrates a block diagram of a network node (NN) 700, in accordance with various embodiments of the invention. The NN 700 is an example of a wireless communication node that can be configured to implement the various methods described herein. In some embodiments, the NN 700 may be wireless communication node such as an access point (AP), as described herein. In other embodiments, the NN 700 may be a wireless communication device such as a station (STA), as described herein. As shown in FIG. 7, the NN 700 includes a housing 740 containing a system clock 702, a processor 704, a memory 706, a transceiver 710 comprising a transmitter 712 and receiver 714, a power module 708, and a Nulling module 720.

In this embodiment, the system clock 702 provides the timing signals to the processor 404 for controlling the timing of all operations of the NN 700. The processor 704 controls the general operation of the NN 700 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 706, which can include both read-only memory (ROM) and random access memory (RAM), can provide instructions and data to the processor 704. A portion of the memory 706 can also include non-volatile random access memory (NVRAM). The processor 704 typically performs logical and arithmetic operations based on program instructions stored within the memory 706. The instructions (a.k.a., software) stored in the memory 406 can be executed by the processor 704 to perform the methods described herein. The processor 404 and memory 706 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 710, which includes the transmitter 712 and receiver 714, allows the NN 700 to transmit and receive data to and from an external network node (e.g., an STA or AP). An antenna 750 is typically attached to the housing 740 and electrically coupled to the transceiver 710. In various embodiments, the NN 700 includes (not shown) multiple transmitters, multiple receivers, and multiple transceivers. In some embodiments, the antenna 750 includes a multi-antenna array that can form a plurality of beams each of which points in a distinct direction in accordance with MIMO beamforming techniques.

The Nulling module 720 may be implemented as part of the processor 704 programmed to perform the functions herein, or it may be a separate module implemented in hardware, firmware, software or a combination thereof. In accordance with various embodiments, the Nulling module 720 is configured to perform interference nulling (attenuating) functions as described herein, such as performing channel-state information (CSI) measurements, pre-coding computations, data transmission, or acknowledgement (ACK), Clear to Send (CTS) or generating nulling transmissions, as discussed above. In some embodiments, the Nulling module 720 can be implemented as software (i.e., computer executable instructions) stored in a non-transitory computer-readable medium that when executed by processor 704, transform the processor 704 into a special-purpose computer to perform the nulling operations described herein.

The various components and modules discussed above within housing 740 are coupled together by a bus system 730. The bus system 730 can include a data bus and, for example, a power bus, a control signal bus, and/or a status signal bus in addition to the data bus. It is understood that the modules of the NN 700 can be operatively coupled to one another using any suitable techniques and mediums. It is further understood that additional modules (not shown) may be included in the NN 700 without departing from the scope of the invention.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, signal, etc. that is physically constructed, programmed, arranged and/or formatted to perform the specified operation or function.

Furthermore, a person of ordinary skill in the art would understand that various illustrative logical blocks, modules, devices, components and circuits described herein can be implemented within or performed by an integrated circuit (IC) that can include a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A processor programmed to perform the functions herein will become a specially programmed, or special-purpose processor, and can be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a first wireless communication node for initiating a nulling transmission, the method comprising:
    transmitting a control message to be received by a second wireless communication node,
    wherein the control message informs the second wireless communication node to initiate the nulling transmission toward a first station;
    transmitting data to the first station during transmission of the nulling transmission from the second wireless communication node to the first station; and
    transmitting the control message to the first station so as to cause the first station to transmit a response message to be received by the second wireless communication node,
    wherein the response message causes the second wireless communication node to select a second station based on whether a strength of a residual signal to be received by the first station as a result of the data transmission from the second wireless communication node to the second station is less than or equal to a predetermined threshold value, and
    wherein a nulling operation is performed on a data transmission from the second wireless communication node to the second station.

2. The method of claim 1, wherein:
    transmitting the data to the first station is initiated after a predetermined time period has elapsed; and
    the control message causes the second wireless communication node to initiate the nulling transmission after the predetermined time period has elapsed.

3. The method of claim 2, further comprising:
    after transmitting the control message, receiving a response message from the second wireless communication node, wherein the predetermined time period is determined based on a time of receiving the response message,
    wherein the nulling transmission is initiated after the predetermined time period has elapsed.

4. The method of claim 3, wherein:
    a first duration of a transmission from the first wireless communication node is contained in the control message;
    a second duration of a transmission from the second wireless communication node is contained in the response message; and
    a duration of the nulling transmission is selected to be longer of the first duration and the second duration.

5. The method of claim 1, wherein the control message is received by a third wireless communication node, and wherein the control message causes second and third wireless communication nodes to initiate a channel contention procedure, and wherein once a nulling transmission from either the second or third wireless communication node is detected, the other wireless communication node suspends its channel contention procedure until the nulling transmission is no longer detected.

6. A method performed by a first wireless communication node for providing a nulling transmission, the method comprising:
    receiving a control message from a second wireless communication node, wherein the control message informs the first wireless communication node to initiate the nulling transmission toward a first station;
    transmitting data to a second station during transmission of the nulling transmission to the first station; and
    receiving a response message transmitted from the first station, wherein the response message is transmitted in response to receiving the control message from the second wireless node,
    wherein the received response message causes the first wireless communication node to select a second station based whether a strength of a residual signal to be received by the first station as a result of the data transmission from the first wireless communication node to the second station is less than or equal to a predetermined threshold value, and
    wherein a nulling operation is performed on a data transmission from the first wireless communication node to the second station.

7. The method of claim 6, wherein:
    transmitting the data to the second station is initiated after a predetermined time period has elapsed; and
    the control message causes the first wireless communication node to initiate the nulling transmission after the predetermined time period has elapsed.

8. The method of claim 7, further comprising:
    after receiving the control message, transmitting a response message from the first wireless communication node, wherein the predetermined time period is determined based on a time of transmitting the response message,
    wherein the nulling transmission is initiated after the predetermined time period has elapsed.

9. The method of claim 8, wherein:
    a first duration of a transmission from the first wireless communication node is contained in the response message;
    a second duration of a transmission from the second wireless communication node is contained in the control message; and
    a duration of the nulling transmission is selected to be longer of the first duration and second the duration.

10. The method of claim 6, wherein the control message is received by a third wireless communication node, and wherein the control message causes first and third wireless communication nodes to initiate a channel contention procedure, and wherein once a nulling transmission from either the first or third wireless communication node is detected, the other wireless communication node suspends its channel contention procedure until the nulling transmission is no longer detected.

11. A wireless communication apparatus comprising at least one processor and a memory storing instructions, execution of which by the at least one processor causes the apparatus to perform operations comprising:
    transmitting a control message to be received by a wireless communication node,
    wherein the control message informs the wireless communication node to initiate a nulling transmission toward a first station;
    transmitting data to the first station during transmission of the nulling transmission from the wireless communication node to the first station, and transmitting the control message to the first station so as to cause the first station to transmit a response message to be received by a second wireless communication node, wherein the response message causes the second wireless communication node to select a second station based on whether a strength of a residual signal to be received by the first station as a result of the data transmission from the second wireless communication node to the second station is less than or equal to a predetermined threshold value, and wherein the nulling operation is performed on a data transmission from the second wireless communication node to the second station.

12. The apparatus of claim 11, wherein:

transmitting the data to the first station is initiated after a predetermined time period has elapsed; and the control message causes the wireless communication node to initiate the nulling transmission after the predetermined time period has elapsed.

13. The apparatus of claim 12, wherein the operations further comprise:

after transmitting the control message, receiving a response message from the wireless communication node, wherein the predetermined time period is determined based on a time of receiving the response message, wherein the nulling transmission is initiated after the predetermined time period has elapsed.

14. The apparatus of claim 13, wherein:

a first duration of a transmission from the apparatus is contained in the control message;

a second duration of a transmission from wireless communication node is contained in the response message; and a duration of the nulling transmission is selected to be longer of the first duration and the second duration.

15. The apparatus of claim 11, wherein the control message is received by a third wireless communication node, and wherein the control message causes second and third wireless communication nodes to initiate a channel contention procedure, and wherein once a nulling transmission from either the second or third wireless communication node is detected, the other wireless communication node suspends its channel contention procedure until the nulling transmission is no longer detected.

16. A wireless communication apparatus comprising a processor and a memory storing instructions, execution of which by the processor causes the apparatus to perform operations comprising:

receiving a control message from a wireless communication node, wherein the control message informs the apparatus to initiate a nulling transmission toward a first station;

transmitting data to a second station during transmission of the nulling transmission to the first station; and transmitting the control message to the first station so as to cause the first station to transmit a response message to be received by the second wireless communication node, wherein the response message causes the second wireless communication node to select a second station based on whether a strength of a residual signal to be received by the first station as a result of the data transmission from the second wireless communication node to the second station is less than or equal to a predetermined threshold value, and wherein the nulling operation is performed on a data transmission from the second wireless communication node to the second station.

17. The apparatus of claim 16, wherein:

transmitting the data to the second station is initiated after a predetermined time period has elapsed; and the control message causes the apparatus to initiate the nulling transmission after the predetermined time period has elapsed.

18. The apparatus of claim 17, wherein the operations further comprise:

after receiving the control message, transmitting a response message from the apparatus, wherein the predetermined time period is determined based on a time of transmitting the response message, wherein the nulling transmission is initiated after the predetermined time period has elapsed.

19. The apparatus of claim 18, wherein:

a first duration of a transmission from the apparatus is contained in the response message;

a second duration of a transmission from the wireless communication node is contained in the control message; and a duration of the nulling transmission is selected to be longer of the first duration and the second duration.

20. The apparatus of claim 16, wherein the control message is received by a third wireless communication node, and wherein the control message causes second and third wireless communication nodes to initiate a channel contention procedure, and wherein once a nulling transmission from either the second or third wireless communication node is detected, the other wireless communication node suspends its channel contention procedure until the nulling transmission is no longer detected.

* * * * *